(12) United States Patent
Vasseur et al.

(10) Patent No.: US 11,729,097 B2
(45) Date of Patent: Aug. 15, 2023

(54) QOS CONFIGURATION UPDATE BASED ON BEHAVIORAL APPLICATION CORRELATION

(71) Applicant: Cisco Technology, Inc., San Jose, CA (US)

(72) Inventors: Jean-Philippe Vasseur, Saint Martin d'Uriage (FR); Grégory Mermoud, Venthône (CH); Vinay Kumar Kolar, San Jose, CA (US); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/242,708

(22) Filed: Apr. 28, 2021

(65) Prior Publication Data
US 2022/0353181 A1   Nov. 3, 2022

(51) Int. Cl.
*H04L 45/00* (2022.01)
*H04L 43/08* (2022.01)

(52) U.S. Cl.
CPC .............. *H04L 45/70* (2013.01); *H04L 43/08* (2013.01)

(58) Field of Classification Search
CPC ................................. H04L 45/70; H04L 43/08
See application file for complete search history.

(56) References Cited

U.S. PATENT DOCUMENTS

| | | | |
|---|---|---|---|
| 6,822,940 B1 | 11/2004 | Zavalkovsky et al. | |
| 7,433,688 B2 | 10/2008 | Miernik et al. | |
| 9,450,817 B1 | 9/2016 | Bahadur et al. | |
| 10,708,144 B2 | 7/2020 | Mohan et al. | |
| 2006/0056291 A1* | 3/2006 | Baker | H04L 43/00 370/229 |
| 2017/0019312 A1* | 1/2017 | Meyer | G06N 20/00 |
| 2017/0264540 A1* | 9/2017 | Phelan | H04L 65/80 |
| 2019/0007270 A1 | 1/2019 | Suragi Math et al. | |
| 2021/0176114 A1* | 6/2021 | Hsu | H04L 41/0631 |

* cited by examiner

*Primary Examiner* — Viet D Vu
(74) *Attorney, Agent, or Firm* — Behmke Innovation Group LLC; Kenneth J. Heywood; Jonathon P. Western

(57) ABSTRACT

In one embodiment, a device obtains behavioral metrics for application traffic in a network for a plurality of applications. The device identifies a first application and a second application from among the plurality of applications as fate sharing applications, based on a correlation between the behavioral metrics for their application traffic. The device generates a configuration change for the network that would prevent the first application and the second application from being fate sharing applications, when application traffic for the first application negatively affects the behavioral metrics for the application traffic of the second application. The device causes the configuration change to be implemented in the network.

20 Claims, 9 Drawing Sheets

QOS CONFIGURATION UPDATE BASED ON BEHAVIORAL APPLICATION CORRELATION

TECHNICAL FIELD

The present disclosure relates generally to computer networks, and, more particularly, to quality of service (QoS) configuration update based on behavioral application correlation.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits.

With the recent evolution of machine learning, predictive failure detection and proactive routing in an SDN/SD-WAN now becomes possible through the use of machine learning techniques. However, the decision to fully automate routing decisions or to keep them manually controlled by a network administrator has largely been a binary decision, with many network administrators remaining leery of ceding control of the network over to a predictive engine. In addition, predictive routing approaches today typically seek only to maximize the potential performance gains in the network without taking into account the risk and negative effects of an incorrect prediction.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
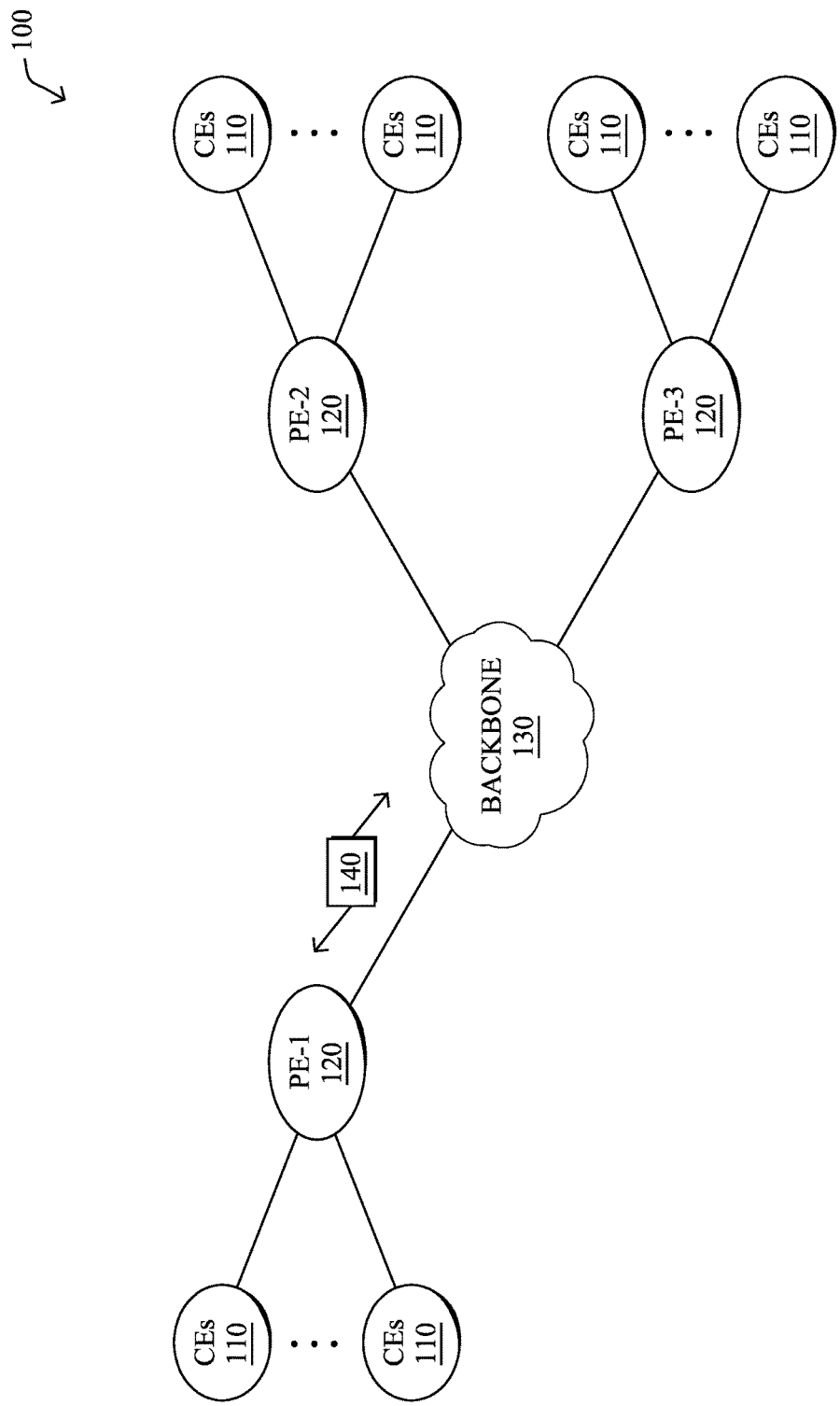
FIGS. 1A-1B illustrate an example communication network.

According to one or more embodiments of the disclosure, a device obtains behavioral metrics for application traffic in a network for a plurality of applications. The device identifies a first application and a second application from among the plurality of applications as fate sharing applications, based on a correlation between the behavioral metrics for their application traffic. The device generates a configuration change for the network that would prevent the first application and the second application from being fate sharing applications, when application traffic for the first application negatively affects the behavioral metrics for the application traffic of the second application. The device causes the configuration change to be implemented in the network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334EEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of tybe B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
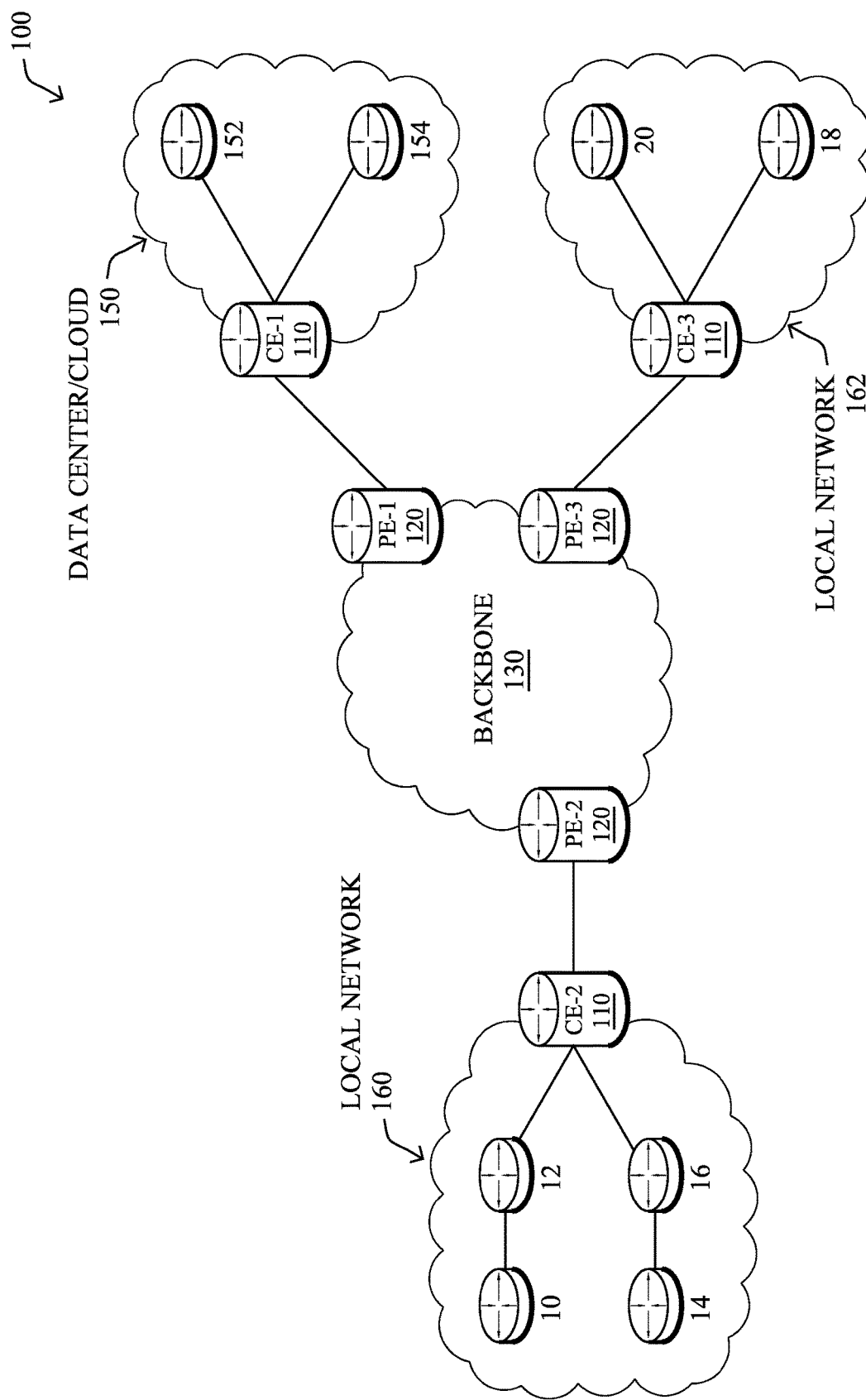

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
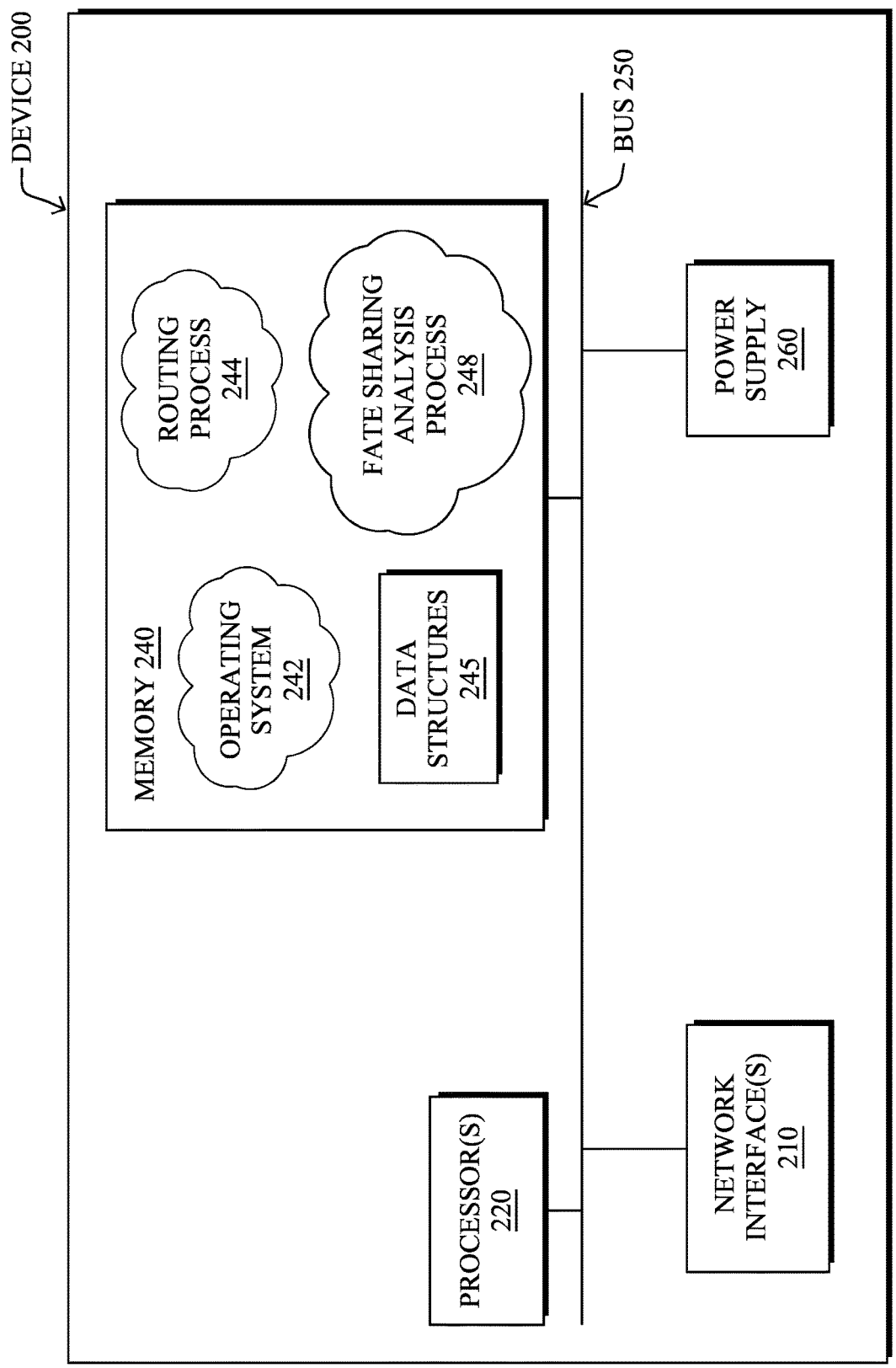
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a fate sharing analysis process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or fate sharing analysis process 248 may also include computer executable instructions that, when executed by processor(s) 220, cause device 200 to perform the techniques described herein. To do so, in some embodiments, routing process 244 and/or fate sharing analysis process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or fate sharing analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or fate sharing analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
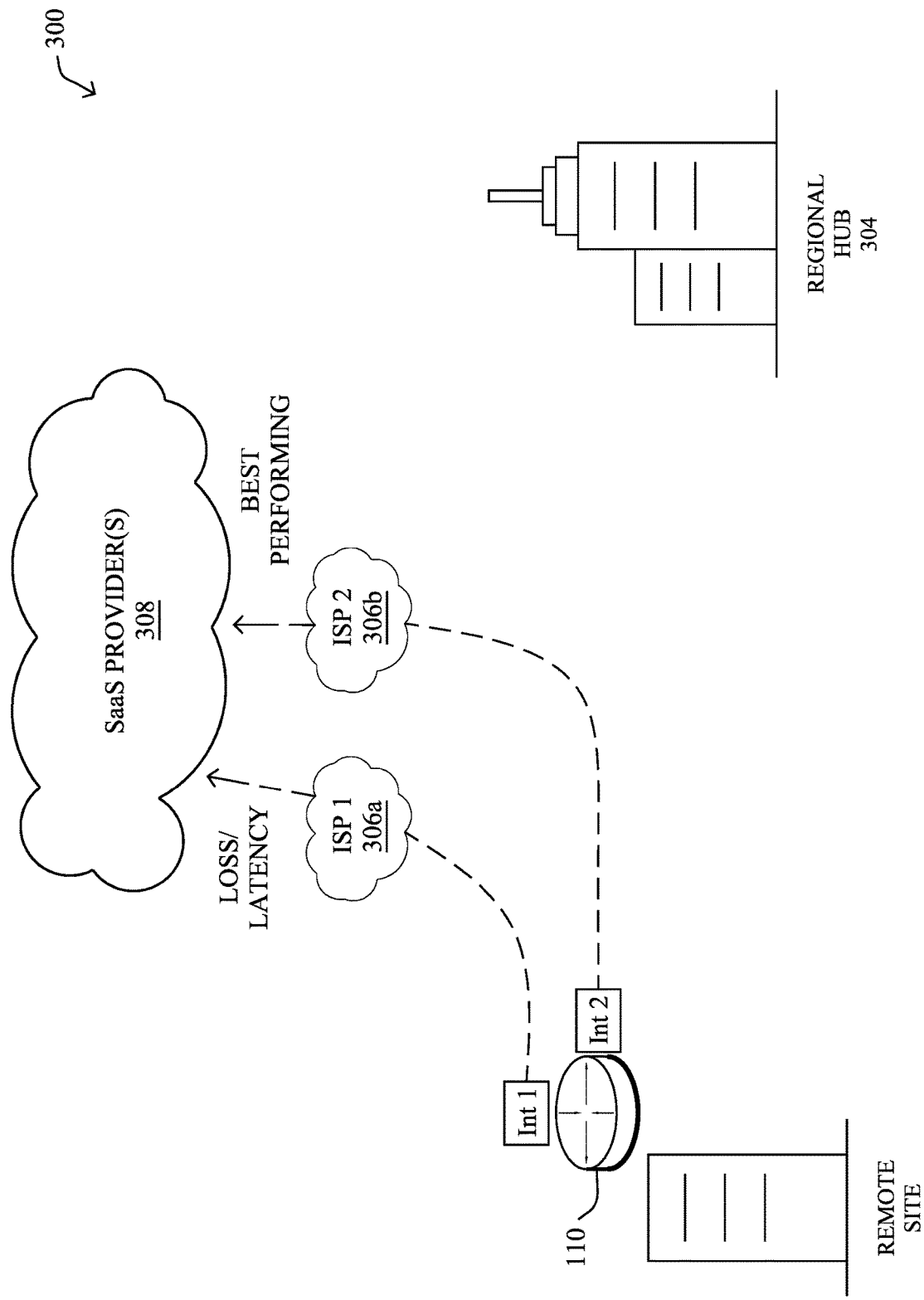
FIGS. 3A-3B illustrate example network deployments.
Figure 3B:
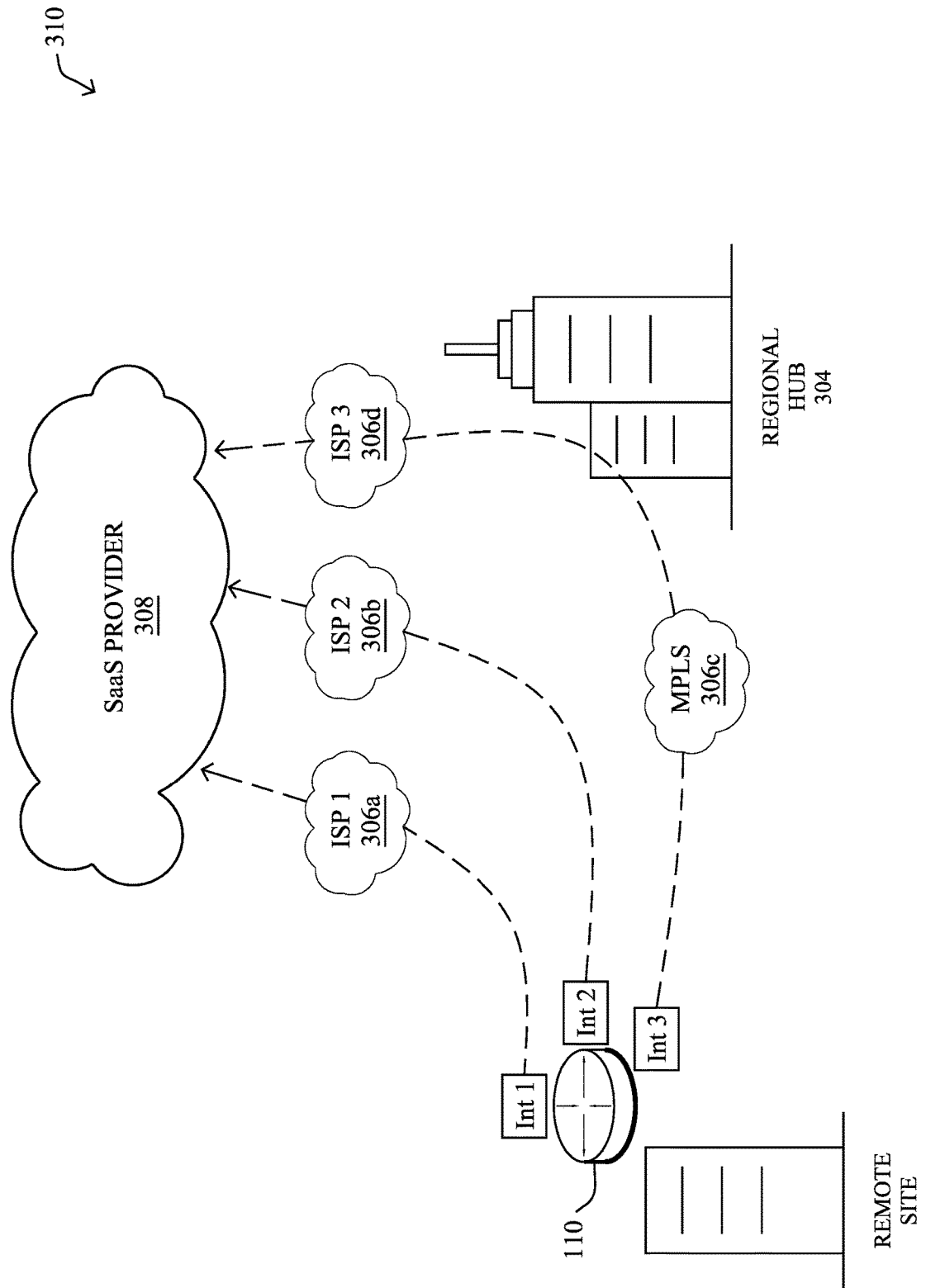

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
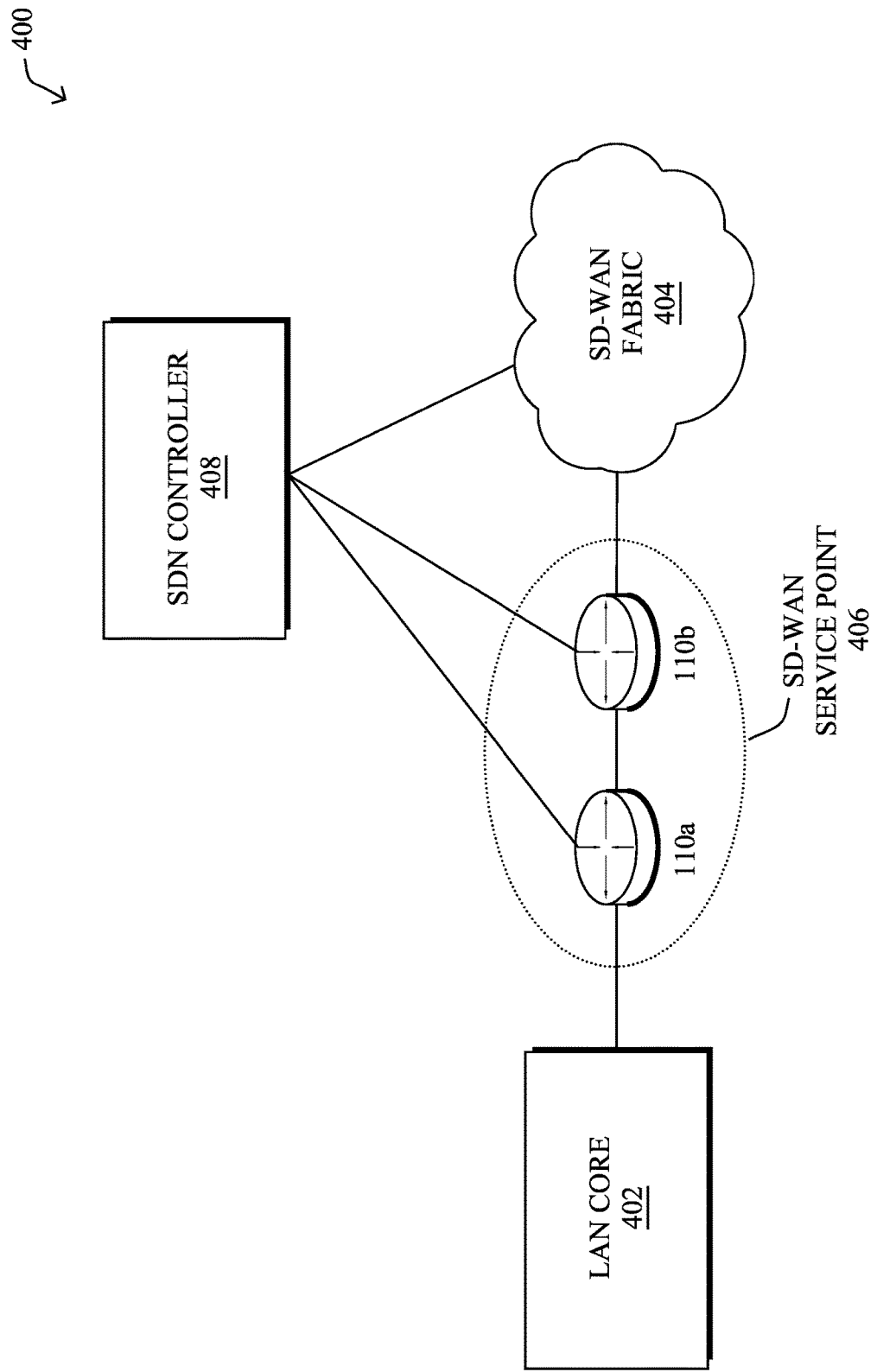
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that, it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.
Routing is still entirely reactive: decisions are made using probes that reflect the status of a path at a given time, in contrast with the notion of an informed decision.
SLA failures are very common in the Internet and a good proportion of them could be avoided (e.g., using an alternate path), if predicted in advance.

Figure 4B:
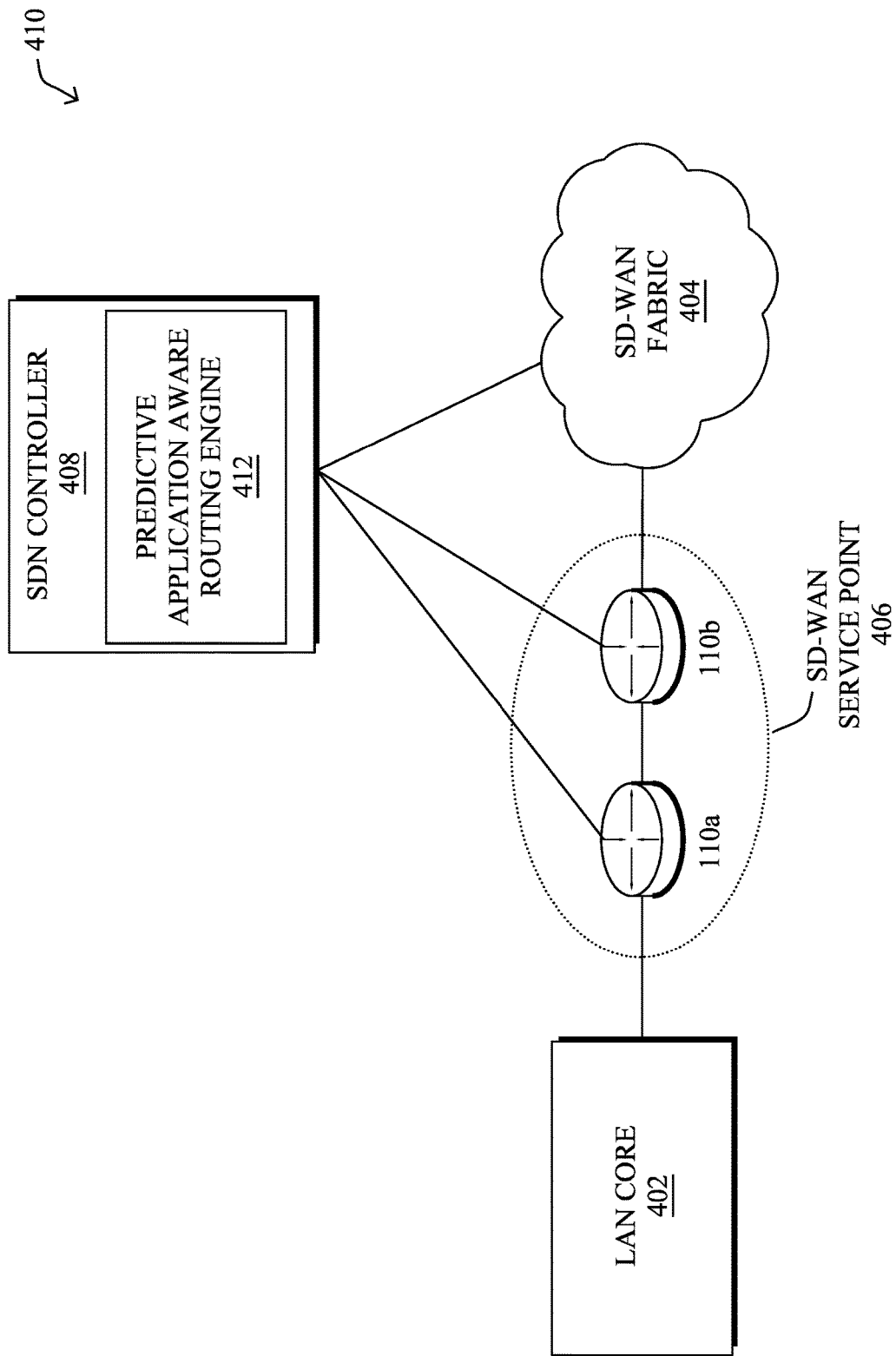

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or fate sharing analysis process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As noted above, a challenge with ensuring satisfactory QoS and QoE lies in the ability to appropriately mark traffic, such as by using an IPv4 Type of Service (ToS) byte or Differentiated Services Code Point (DSCP, configure the queuing systems (e.g., the number of queues, resource allocation strategy per queue, use of (W)RED mechanisms, etc.), assign Class of Services to queues, and/or use a potential input/output shaper/policer. Over the years, QoS policy for applications, such as those for collaboration, has even changed (e.g., use of one or more priority queues, give precedence to voice traffic over video streams, etc.), with the constant aim of providing the best user experience and dealing with the constraints of bounded resources and prioritization.

An issue relates to assigning traffic for multiple applications to a given queue can arise when the application traffic for different applications are fate sharing. In other words, the application traffic for those applications are competing for the same resource, which can potentially lead to interactions that are detrimental to one or all of the applications. Note that in contrast with other technologies, such as Asynchronous Transfer Mode (ATM), IP networks make use of a limited number of queues such that each queue is shared by potentially a large number of applications.

Progressive Automation with Predictive Application Network Analytics

The techniques introduced herein allow for the detection of potential interactions between the traffic of different applications that may be detrimental to their performance. In some aspects, closed loop control can be used to alleviate these conditions, such as by assigning traffic to different queues.

Illustratively, the techniques described herein may be performed by hardware, software, and/or firmware, such as in accordance with fate sharing analysis process 248, which may include computer executable instructions executed by the processor 220 (or independent processor of interfaces 210) to perform functions relating to the techniques described herein (e.g., in conjunction with routing process 244).

Specifically, according to various embodiments, a device obtains behavioral metrics for application traffic in a network for a plurality of applications. The device identifies a first application and a second application from among the plurality of applications as fate sharing applications, based on a correlation between the behavioral metrics for their application traffic. The device generates a configuration change for the is network that would prevent the first application and the second application from being fate sharing applications, when application traffic for the first application negatively affects the behavioral metrics for the application traffic of the second application. The device causes the configuration change to be implemented in the network.

Figure 5:
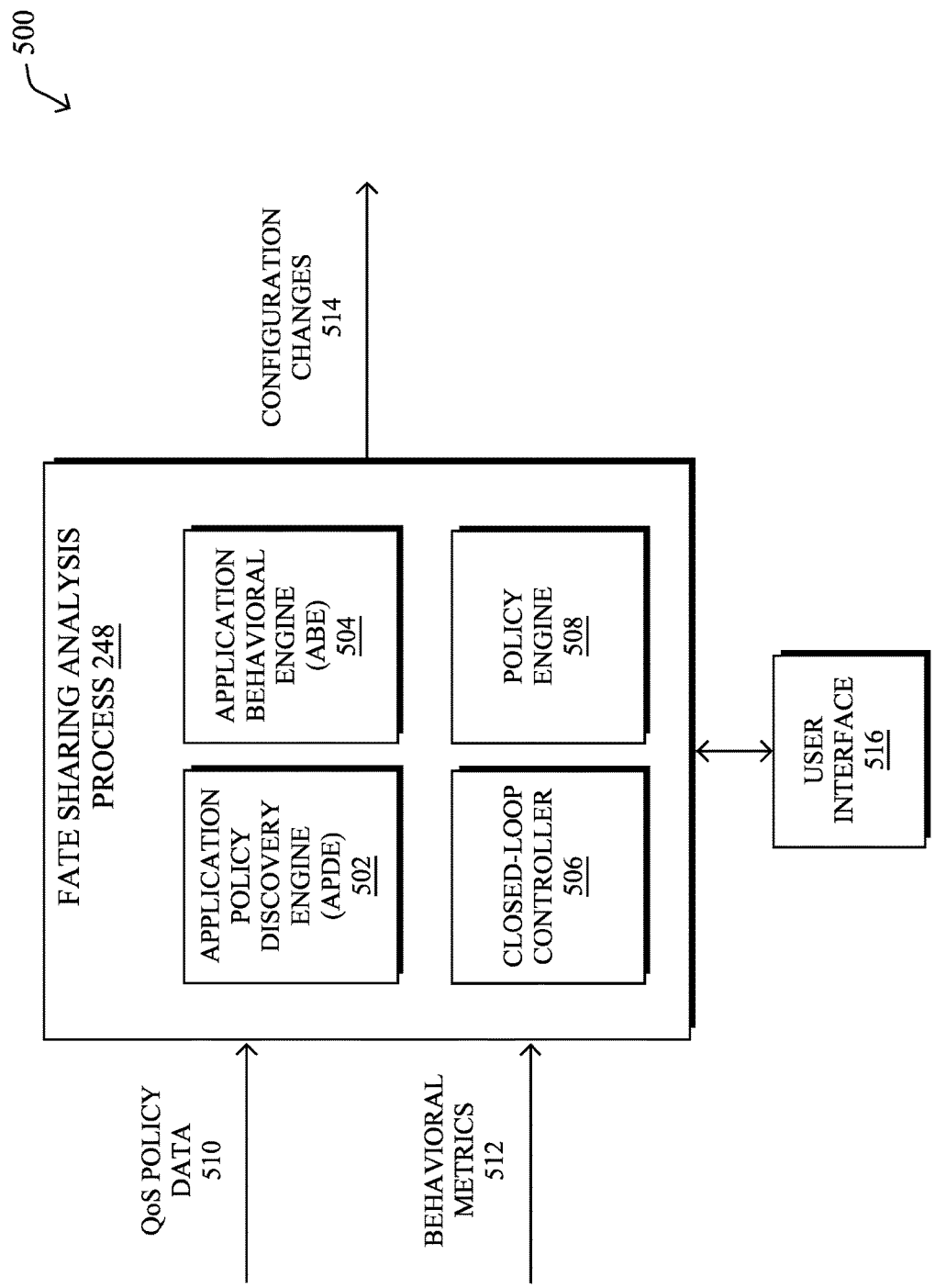
FIG. 5 illustrates an example architecture for identifying and rectifying negative fate sharing among application traffic.

Operationally, FIG. 5 illustrates an example architecture 500 for identifying and rectifying negative fate sharing among application traffic, according to various embodiments. At the core of architecture 500 is fate sharing analysis process 248, which may be executed by a controller for a network or another device in communication therewith. For instance, fate sharing analysis process 248 may be executed by a controller for a network (e.g., SDN controller 408 in FIGS. 4A-4B), a particular networking device in the network (e.g., a router, etc.), another device or service in communication therewith, or the like.

As shown, fate sharing analysis process 248 may include any or all of the following components: an application policy discovery engine (APDE) 502, an application behavioral engine (ABE) 504, a closed-loop controller 506, and/or a policy engine 508. As would be appreciated, the functionalities of these components may be combined or omitted, as desired. In addition, these components may be implemented on a singular device or in a distributed manner, in which case the combination of executing devices can be viewed as their own singular device for purposes of executing fate sharing analysis process 248.

During execution, application policy discovery engine (APDE) 502 may be used by fate sharing analysis process 248 to obtain QoS policy data 510 for a given site. For instance, APDE 502 may leverage an application programming interface (API) of the SDN controller overseeing that site, to retrieve QoS policy data 510. In other cases, QoS policy data 510 may be provided to APDE 502 on a push basis or retrieved directly by APDE 502 from the site. In general, QoS policy data 510 may be indicative of any or all is of the following: the number of queues available on a particular device or site; the queuing strategy in place, such as modified deficit round robin (MDRR), weighted fair queueing (WFQ), first-in-first-out (FIFO); use of weighted random early detection (W(RED)) along with its corresponding parameters; use of a policer/shaper (input/output; etc.

Other information that APDE 502 may also obtain is behavioral metrics 512. In some embodiments, behavioral metrics 512 may include low level traffic telemetry metrics, such as on a per-queue basis. For instance, behavioral metrics 512 may indicate the amount of traffic marked with a given policy (and related application), number of packets dropped, water marking counters, queueing statistics (e.g., average waiting and/or processing times in queues), etc.

In some embodiments, behavioral metrics 512 may also include QoE metrics regarding the various applications whose application traffic is sent to/from the site. In some instances, these QoE metrics may take the form of application layer feedback reflecting the actual user experience for a given application. For instance, the QoE metrics may take the form of a mean opinion score (MOS) or other QoE metrics specified by users of the applications (e.g., ratings on a scale of 1-10, etc.). Several applications may be characterized by their own MOS, without requiring for the MOS scores to be consistent across the plurality of different application.

In various embodiments, another component of fate sharing analysis process 248 may be application behavioral engine (ABE) 504, which is configured to determine whether different applications are fate sharing applications, meaning that the behavioral metrics for their application traffic are related in some manner. For instance, this may be the case when the traffic for two or more applications share the same queue, same set of sub-interfaces, paths, etc. In one embodiment, fate sharing may have the limited scope of the single outbound (sub) interface queue where QoS is enabled. In a second embodiment, sharing may be extended to an entire path shared by a set of applications.

ABE 504 may use various approaches, to assess the behaviors of the applications, based on 512:

Telemetry-based: for example, a simple (still interesting) key performance indicator (KPI) metric used to assess the application behavior may be the application throughput. Since most applications make use of adaptive throughput strategies (e.g., TCP), the throughput may be a strong indicator of the network resources provided to a given application (and thus of the user experience such as the video resolution, the voice quality, speed for a file transfer).

More advanced strategies consist in using application layer feed-back reflecting the actual user experience for a given application. For example, the voice MoS score may be used to reflect the user voice experience. Several applications may be characterized by their own MoS without requiring for the MoS to be consistent across a set of applications considered by the proposed invention. What matters is to detect interferences between applications experience, regardless of the nature of the application behavioral metrics.

ABE 504 will then compute correlation between applications with fate sharing (link or path) using their respective behavioral metrics. ABE 504 may use various techniques to compute such correlations (e.g., Pearson coefficient, Spearman's rho, etc.)

and the behavioral KPI may be of different nature (e.g., distribution, single scalar, time-series). For a given group of applications with fate sharing, ABE 504 may then compute any positive or negative correlations. For instance, ABE 504 may compute a matrix of correlation coefficients, to determine whether any fate sharing applications are negatively correlated (e.g., the behavior of one application's traffic negatively affects that of another).

Strong negative correlations in time are very likely to reveal some level of interferences between applications effectively competing for resources, which may or may not the desired. In other embodiments, ABE 504 may analyze timeseries of is application QoS metric (e.g., throughput), to detect applications that have time-lagged QoS decrease. For example, if throughput of one application A1 is detected to decrease after t time-units lag of another fate-shared application A2, then ABE 504 may infer that an increase in the traffic throughput of A2 at time t will usually result in decrease of throughput for A1. To infer such behavior, ABE 504 may use an approach such as time-lagged cross-correlation (TLCC) or the like.

The situation of path fate sharing is slightly more complicated. It requires additional investigation, to determine the actual location of the interference, a required step if the closed-loop control is performed at the application level (change the QoS). If the remediation operates at the path level (e.g., by rerouting the traffic onto a different path) then such step is actually not required. Such an approach allows for the proposed invention to be used to act at the link level (acting on QoS) or path level (path selection).

A further component of fate sharing analysis process 248 is closed-loop controller 506, which allows for closed-loop control over the application traffic of fate sharing applications, by generating configuration changes 514 for the network that are intended to remove the fate sharing conditions between pairs of applications. To this end, fate sharing analysis process 248 may send configuration changes 514 either directly to the networking device(s) involved or, alternatively, to a controller for such devices, such as an SDN controller.

In a first embodiment, upon detecting interference between applications sharing fate at the interface level, closed-loop controller 506 allows for moving a given application A1 suffering "because" of another application A2 to a different Class of Service (CoS) (e.g. a different WRED profile in the same queue, or a different queue). In to one embodiment, A1 is moved to a different CoS while monitoring the behavioral KPI (e.g., throughput, MoS score) of the moved application A1 but also all of the other applications using the CoS(A1'). After the expiration of an observation period, if the new policy does not have a negative impact for the applications sharing the CoS(A1') and the behavioral KPI for A1 is significantly improved (e.g relative increase of the MoS score, . . . ), then the QoS reconfiguration policy is validated. Such observations may be performed by closed-loop controller 506 either in the cloud or on the router itself (locally), in which case feed-back about application behavior KPIs are provided by the central engine using custom messages.

For a given set of correlated applications (say, A1 A2, A3), closed-loop controller 506 may select which one to move to a different CoS. Indeed, the correlation information indicates joint fate sharing, but whether to change the CoS for A1, for A2 or for A3 may not have the same impact. To this end, in various embodiments, closed-loop controller 506 may employ any of the following strategies:

Pick an application based on amount of traffic. For instance, changing the CoS for the application with the most packets or most bytes (noisiest neighbor)

Try multiple applications in succession until the KPI has significantly improved and use the validation step.

Use historical data: when a new application appears and shows correlation with other previously seen application, it can be moved to a different CoS. This limits impact on existing workloads.

Note that the new policy may then be propagated to other sites by ABE 504 upon determining that such policy could benefit other routers of the network. Propagation may either be global (to all routers) or incremental while propagating to other nodes progressively as the beneficial effects are confirmed by ABE 504.

In any other cases, such as when other applications are impacted or the performance of A1 is not significantly improved, then closed-loop controller 506 may stop the corrective actions. Other closed-loop mechanism may also be used, such as by changing the QoS configuration (RED parameters), or even applying some shaper to the traffic of "offending" applications A2, still while monitoring the performance of A2. If the use of a shaper (policer) applied to the application A2 allows for improving A1 (no more interference) without penalizing A2 (e.g., no significant drop or the MoS score), then the algorithm stops, and the problem is solved. Reinforcement learning techniques can be used to learn how to adjust these parameters to improve the performance. Learning can be done across instances for each application, so as to learn the right 'levers' to pull for a given application when there is contention on the interface. For instance, multi-armed bandit models can be used. Instead of selecting path, parameter levels for QoS configuration or shaping can be used as the arms. In addition, closed-loop controller 506 can learn a centralized model from a large number of actions at the level of individual interfaces. When fate sharing is detected, a number of actions can be taken by closed-loop controller 506, some time apart, until the behavioral KPI is good enough.

In yet another embodiment, the same approach applies to the path fate sharing situation where two or more applications share the same path and ABE 504 compute interference. Here, the configuration change pushed by closed-loop controller 506 consists in moving a set of applications from path X to path Y, while trying to resolve the interference issue without impacting the application performance (e.g., using application-level KPI, which may be application specific). Thus, path selection may be prompted upon detecting interference between applications. This is in contrast to existing approaches that are governed by the per-application SLA instead of a holistic approach looking at potential interferences between application sharing the same path. For the situation of a path, groups of applications may first be considered with a high fate sharing coefficient (e.g., two applications sharing a multi-AS path, etc.).

Finally, fate sharing analysis process 248 may also include policy engine 508 that allows a user of user interface 516 to specify the closed-loop mechanisms that can be used for a given application. For example, the user may restrict the corrective measures that can be taken by, closed-loop controller 506 with respect to a certain application to "change of RED profile," "use of a shaper," "change of CoS," or simply no restrictions. Another such policy may allow closed-loop controller 506 to move the traffic for a particular application to another path or on a per CoS basis. The ability to avoid restrictions is to allow for QoS tuning according to the nature of the link. Indeed, the link characteristics may dramatically vary (e.g. ADSL, SDLS, Satellite, 5G, etc.),leading to a QoS approach that may be radically different. Such a system would then tune the QoS approach based on application behaviors and the nature of the outbound links.

Figure 6:
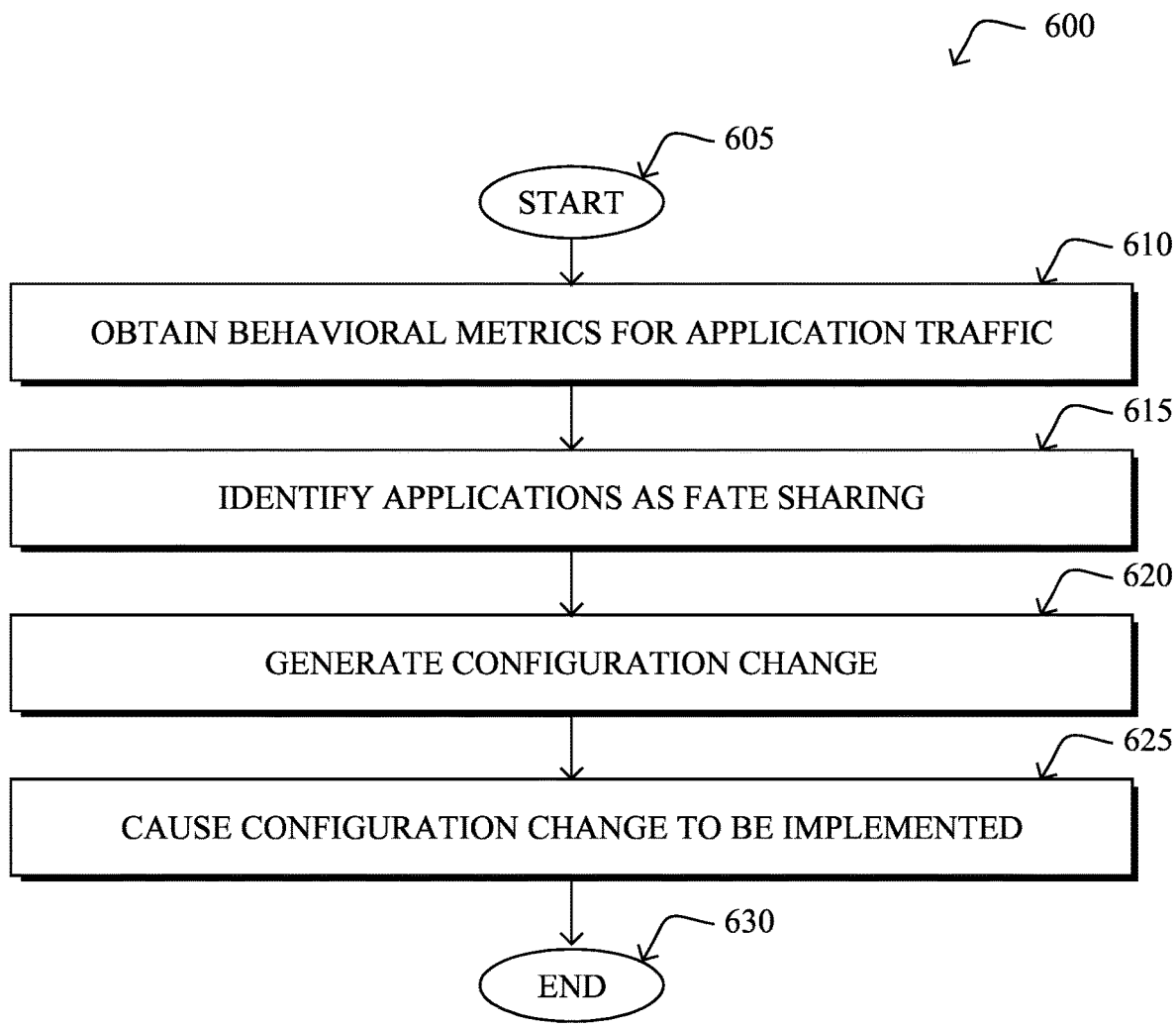
FIG. 6 illustrates an example simplified procedure for implementing a configuration change in a network.

FIG. 6 illustrates an example simplified procedure 600 for implementing a suggested routing change in a network, in accordance with one or more embodiments described herein. For example, a non-generic, specifically configured device (e.g., device 200), such as controller for a network (e.g., an SDN controller or other device in communication there with), may perform procedure 600 by executing stored instructions (e.g., routing process 244 and/or fate sharing analysis process 248). The procedure 600 may start at step 605, and continues to step 610, where, as described in greater detail above, the device may obtain behavioral metrics for application traffic in a network for a plurality of applications. In some embodiments, the behavioral metrics comprise quality of experience metrics specified by users of the applications. In further embodiments, the behavioral metrics comprise at least one of: a count of application traffic marked with a given policy, a number of dropped packets, water marking counters, or queuing statistics.

At step 615, as detailed above, the device may identify a first and second application from among the plurality as fast sharing, based on a correlation between the behavioral metrics for their application traffic. In various embodiments, the device may do so by computing a measure of correlation between the behavioral metrics for the application traffic of the first application and the behavioral metrics for the application traffic of the second application.

At step 620, the device may generate a configuration change for the network that would prevent the first application and the second application from being fate sharing applications, as described in greater detail above. In various embodiments, the device may do so when application traffic for the first application negatively affects the behavioral metrics for the application traffic of the second application. For instance, the application traffic for the two applications may be sent via a particular interface of a networking device in the network, via a particular path, or the like. In some embodiments, the configuration change may cause the application traffic for the second is application to be assigned to a different class of service (CoS). In further embodiments, the device may generate the configuration change based in part on a policy associated with the second application that indicates that the configuration change is allowed for the application traffic for the second application.

At step 625, as detailed above, the device may cause the configuration change to be implemented in the network. For instance, the configuration change may cause the application traffic for the second application to be sent via a different interface, a different path, using a different CoS, or the like. Such a configuration change may be pushed to the router via which the application traffic for the two applications is sent, either directly or indirectly, such as via an SDN controller that oversees operation of that router. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection of fate sharing among applications whose traffic is conveyed in a network via the same interface, path, etc. In turn, when the traffic of one of these applications negatively affects the traffic of another, the system may take corrective measures, such as by reassigning traffic to different queues, different paths, or initiating other corrective measures that alleviate the fate sharing condition between the applications.

While there have been shown and described illustrative embodiments that provide for QoS configuration update based on behavioral application correlation, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the is models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a device, behavioral metrics for application traffic in a network for a plurality of applications, wherein the behavioral metrics comprise quality of experience metrics specified by users of the plurality of applications;
   identifying, by the device, a first application and a second application from among the plurality of applications as fate sharing applications, based on a correlation between the behavioral metrics for their application traffic;
   generating, by the device, a configuration change for the network that would prevent the first application and the second application from being fate sharing applications, when application traffic for the first application negatively affects the behavioral metrics for the application traffic of the second application; and
   causing, by the device, the configuration change to be implemented in the network.

2. The method as in claim 1, wherein the configuration change is generated before a quality of experience metric for either application is predicted to be degraded.

3. The method as in claim 1, wherein the behavioral metrics comprise at least one of: a count of application traffic marked with a given policy, a number of dropped packets, water marking counters, or queueing statistics.

4. The method as in claim 1, wherein identifying the first application and the second application as fate sharing applications comprises:
   computing a measure of correlation between the behavioral metrics for the application traffic of the first application and the behavioral metrics for the application traffic of the second application.

5. The method as in claim 1, wherein the application traffic for the first application and the application traffic for the second application are both sent via a particular interface of a networking device in the network, and wherein the configuration change causes the application traffic for the second application to be sent via a different interface.

6. The method as in claim 1, wherein the application traffic for the first application and the application traffic for the second application are both sent via a particular path in the network, and wherein the configuration change causes the application traffic for the second application to be sent via a different path.

7. The method as in claim 1, wherein the configuration change causes the application traffic for the second application to be assigned a different class of service.

8. The method as in claim 1, wherein the configuration change is generated based in part on a policy associated with the second application that indicates that the configuration change is allowed for the application traffic for the second application.

9. The method as in claim 8, further comprising:
receiving, at the device, the policy via a user interface.

10. The method as in claim 1, wherein causing the configuration change to be implemented in the network comprises:
sending, by the device, the configuration change to a router via which the application traffic for the first application and the second application is sent.

11. An apparatus, comprising:
one or more network interfaces;
a processor coupled to the one or more network interfaces and configured to execute one or more processes; and
a memory configured to store a process that is executable by the processor, the process when executed configured to:
obtain behavioral metrics for application traffic in a network for a plurality of applications, wherein the behavioral metrics comprise quality of experience metrics specified by users of the plurality of applications;
identify a first application and a second application from among the plurality of applications as fate sharing applications, based on a correlation between the behavioral metrics for their application traffic;
generate a configuration change for the network that would prevent the first application and the second application from being fate sharing applications, when application traffic for the first application negatively affects the behavioral metrics for the application traffic of the second application; and
cause the configuration change to be implemented in the network.

12. The apparatus as in claim 11, wherein the configuration change is generated before a quality of experience metric for either application is predicted to be degraded.

13. The apparatus as in claim 11, wherein the behavioral metrics comprise at least one of: a count of application traffic marked with a given policy, a number of dropped packets, water marking counters, or queueing statistics.

14. The apparatus as in claim 11, wherein the apparatus identifies the first application and the second application as fate sharing applications by:
computing a measure of correlation between the behavioral metrics for the application traffic of the first application and the behavioral metrics for the application traffic of the second application.

15. The apparatus as in claim 11, wherein the application traffic for the first application and the application traffic for the second application are both sent via a particular interface of a networking device in the network, and wherein the configuration change causes the application traffic for the second application to be sent via a different interface.

16. The apparatus as in claim 11, wherein the application traffic for the first application and the application traffic for the second application are both sent via a particular path in the network, and wherein the configuration change causes the application traffic for the second application to be sent via a different path.

17. The apparatus as in claim 11, wherein the configuration change causes the application traffic for the second application to be assigned a different class of service.

18. The apparatus as in claim 11, wherein the configuration change is generated based in part on a policy associated with the second application that indicates that the configuration change is allowed for the application traffic for the second application.

19. The apparatus as in claim 11, wherein the apparatus comprises a controller for a software-defined network.

20. A tangible, non-transitory, computer-readable medium storing program instructions that cause a device to execute a process comprising:
obtaining, by the device, behavioral metrics for application traffic in a network for a plurality of applications, wherein the behavioral metrics comprise quality of experience metrics specified by users of the plurality of applications;
identifying, by the device, a first application and a second application from among the plurality of applications as fate sharing applications, based on a correlation between the behavioral metrics for their application traffic;
generating, by the device, a configuration change for the network that would prevent the first application and the second application from being fate sharing applications, when application traffic for the first application negatively affects the behavioral metrics for the application traffic of the second application; and
causing, by the device, the configuration change to be implemented in the network.

* * * * *

UNITED STATES PATENT AND TRADEMARK OFFICE
CERTIFICATE OF CORRECTION

PATENT NO. : 11,729,097 B2
APPLICATION NO. : 17/242708
DATED : August 15, 2023
INVENTOR(S) : Jean-Philippe Vasseur et al.

It is certified that error appears in the above-identified patent and that said Letters Patent is hereby corrected as shown below:

In the Specification

Column 2, Line 38, please amend as shown:
nications (PLC) such as IEEE 61334, IEEE P1901.2, and Column 3, Line 44, please amend as shown:
5G/LTE connection). A site of type B may itself be of Column 8, Line 34, please amend as shown:
of the applications that it supports. So far, though, the two Column 11, Line 11, please amend as shown:
change for the network that would prevent the first Column 11, Line 49, please amend as shown:
of the following: the number of queues available on a Column 12, Line 59, please amend as shown:
timeseries of application QoS metric (e.g., throughput), to Column 13, Line 25, please amend as shown:
profile in the same queue, or a different queue). In one Column 13, Line 39, please amend as shown:
For a given set of correlated applications (say, A1, A2, Column 14, Line 39, please amend as shown:
the corrective measures that can be taken by closed-loop Signed and Sealed this
Fourteenth Day of November, 2023

*Katherine Kelly Vidal*
Katherine Kelly Vidal
*Director of the United States Patent and Trademark Office*

CERTIFICATE OF CORRECTION (continued)
U.S. Pat. No. 11,729,097 B2

Column 14, Lines 57-58, please amend as shown:
SDN controller or other device in communication therewith), may perform procedure 600 by executing stored Column 15, Line 23, please amend as shown:
cation traffic for the second application to be assigned to Column 15, Line 63, please amend as shown:
violations, or other disruptions in a network, the models